(12) United States Patent
Vanderzyden et al.

(10) Patent No.: US 8,925,421 B2
(45) Date of Patent: Jan. 6, 2015

(54) INTEGRATED DRIVE GENERATOR GEAR ALIGNMENT

(75) Inventors: Henry R. Vanderzyden, Byron, IL (US); Jonathan C. Dell, Carpentersville, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 217 days.

(21) Appl. No.: 13/542,767

(22) Filed: Jul. 6, 2012

(65) Prior Publication Data

US 2014/0007741 A1 Jan. 9, 2014

(51) Int. Cl.
*H02P 15/00* (2006.01)
*F16H 47/00* (2006.01)

(52) U.S. Cl.
USPC .......................................... 74/730.1

(58) Field of Classification Search
USPC ........................................ 74/730.1; 322/40
See application file for complete search history.

(56) References Cited

U.S. PATENT DOCUMENTS

| | | | |
|---|---|---|---|
| 2,086,491 A | 7/1937 | Dodge | |
| 3,160,418 A | 12/1964 | Barske | |
| 3,576,143 A * | 4/1971 | Baits | 475/77 |
| 4,054,986 A | 10/1977 | Marres et al. | |
| 4,271,947 A * | 6/1981 | Gaeckle | 192/82 T |
| 4,281,273 A | 7/1981 | Baker | |
| 4,327,821 A * | 5/1982 | Telford | 192/35 |
| 4,712,449 A | 12/1987 | Avny | |
| 4,734,590 A * | 3/1988 | Fluegel | 290/1 C |
| 4,755,197 A * | 7/1988 | Benson et al. | 96/187 |
| 4,760,907 A | 8/1988 | Avny | |
| 4,768,634 A * | 9/1988 | Quick et al. | 192/56.56 |
| 4,978,874 A | 12/1990 | Isozumi et al. | |
| 4,989,707 A * | 2/1991 | Doty et al. | 192/69.2 |
| 5,247,794 A * | 9/1993 | Benson et al. | 60/487 |
| 5,701,211 A | 12/1997 | Perry et al. | |
| 5,993,169 A | 11/1999 | Adachi et al. | |
| 6,269,709 B1 | 8/2001 | Sangret | |
| 7,107,722 B2 | 9/2006 | Casali et al. | |
| 2011/0138945 A1 | 6/2011 | Watanabe | |
| 2013/0288840 A1* | 10/2013 | Grosskopf et al. | 475/84 |
| 2014/0008170 A1* | 1/2014 | Vanderzyden et al. | 192/56.5 |
| 2014/0009125 A1* | 1/2014 | Vanderzyden et al. | 322/40 |
| 2014/0009126 A1* | 1/2014 | Vanderzyden et al. | 322/40 |

* cited by examiner

*Primary Examiner* — Ha D Ho

(74) *Attorney, Agent, or Firm* — Carlson, Gaskey & Olds, P.C.

(57) ABSTRACT

A gear assembly includes first and second shafts concentric with one another. First and second gears are respectively provided by the first and second shafts and are arranged adjacent to one another. A biasing assembly cooperates with at least one of the first and second shafts to maintain a desired gap between the first and second gears.

19 Claims, 3 Drawing Sheets

INTEGRATED DRIVE GENERATOR GEAR ALIGNMENT

BACKGROUND

This disclosure relates to an integrated drive generator for use with an aircraft engine, for example. In particular, the disclosure relates to a means of aligning gears.

One example type of integrated drive generator (IDG) includes a generator, a hydraulic unit and a differential assembly arranged in a common housing. The differential assembly is operatively coupled to a gas turbine engine via an input shaft. The rotational speed of the input shaft varies during the operation of the gas turbine engine. The hydraulic unit cooperates with the differential assembly to provide a constant speed to the generator throughout engine operation.

One example of a hydraulic unit incorporates nested coaxial shafts, each having a gear. The gears are arranged adjacent to one another and are coupled to the differential assembly. One gear receives a variable rotational input from the input shaft, and the other gear provides a fixed rotational output from the hydraulic unit. Due to packaging constraints, gear widths and loading, the gears could undesirably contact one another during operation of the IDG.

SUMMARY

In one exemplary embodiment, a gear assembly includes first and second shafts concentric with one another. First and second gears are respectively provided by the first and second shafts and are arranged adjacent to one another. A biasing assembly cooperates with at least one of the first and second shafts to maintain a desired gap between the first and second gears.

In a further embodiment of any of the above, the biasing assembly includes a loading member and a biasing element. The loading member engages an end of one of the first and second shafts and the biasing element urges the loading member against the end.

In a further embodiment of any of the above, the gear assembly includes a third shaft coaxial with the first and second shafts and a hollow receiving the biasing assembly. The second shaft is arranged within the first shaft. The second shaft provides the end.

In a further embodiment of any of the above, the biasing assembly includes a retainer. First and second spring seats are respectively provided by the loading member and the retainer. The biasing element includes a helical spring engaging the first and second spring seats.

In a further embodiment of any of the above, the third shaft is rotationally fixed relative to the second shaft with a splined connection. The splined connection permits the second and third shafts to slide axially relative to one another.

In a further embodiment of any of the above, the gear assembly includes a bearing supporting an end of the second shaft opposite the splined connection.

In a further embodiment of any of the above, the gear assembly includes pairs of bearings supporting each of the second and third shafts.

In another exemplary embodiment, an integrated drive generator includes a housing enclosing a generator. The integrated drive generator includes a hydraulic unit and a differential assembly. The hydraulic unit and differential assembly are configured to cooperate with one another and convert a variable speed and provide a fixed speed to the generator. The hydraulic unit includes first and second shafts concentric with one another. First and second gears are respectively provided by the first and second shafts and arranged adjacent to one another. A biasing assembly cooperates with at least one of the first and second shafts to maintain a desired gap between the first and second gears.

In a further embodiment of any of the above, the integrated drive generator includes an input shaft configured to receive a variable speed and provide the variable speed to the hydraulic unit and the differential assembly.

In a further embodiment of any of the above, the second shaft is a variable speed shaft. The first shaft is a trim speed shaft.

In a further embodiment of any of the above, the integrated drive generator includes a pump plate separating first and second pumping assemblies. Each hydraulic unit includes a wobbler and pistons.

In a further embodiment of any of the above, the biasing assembly includes a loading member and a biasing element. The loading member engages an end of one of the first and second shafts and the biasing element urges the loading member against the end.

In a further embodiment of any of the above, a third shaft coaxial with the first and second shafts and includes a hollow receiving the biasing assembly. The second shaft is arranged within the first shaft. The second shaft provides the end.

In a further embodiment of any of the above, the biasing assembly includes a retainer. First and second spring seats are respectively provided by the loading member and the retainer. The biasing element includes a helical spring engaging the first and second spring seats.

In a further embodiment of any of the above, the third shaft is rotationally fixed relative to the second shaft with a splined connection. The splined connection permits the second and third shafts to slide axially relative to one another.

In a further embodiment of any of the above, a bearing supporting an end of the second shaft opposite the splined connection.

In a further embodiment of any of the above, the integrated drive generator includes pairs of bearings supporting each of the second and third shafts.

In another exemplary embodiment, a method of spacing adjacent gears includes the steps of providing concentric shafts having adjacent gears laterally spaced from one another, and biasing the shafts relative to one another to maintain a desired gap between the first and second gears.

In a further embodiment of any of the above, the biasing step includes operatively engaging an end of one of the shafts with a helical spring.

In a further embodiment of any of the above, the providing step includes coupling a third shaft to the second shaft with a splined connection. The helical spring is arranged within the third shaft.

BRIEF DESCRIPTION OF THE DRAWINGS

The disclosure can be further understood by reference to the following detailed description when considered in connection with the accompanying drawings wherein.

DETAILED DESCRIPTION

Figure 1:
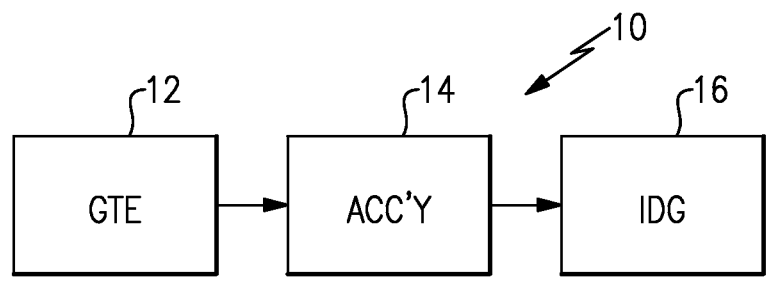
FIG. 1 is a highly schematic view of a generator system.

An example generator system 10 is schematically illustrated in FIG. 1. The system 10 includes a gas turbine engine 12 that provides rotational drive to an integrated drive generator (IDG) 16 through an accessory drive gearbox 14 mounted on the gas turbine engine 12. The accessory drive gearbox 14 is coupled to a spool of the engine 12, and the speed of the spool varies throughout engine operation.

Figure 2:
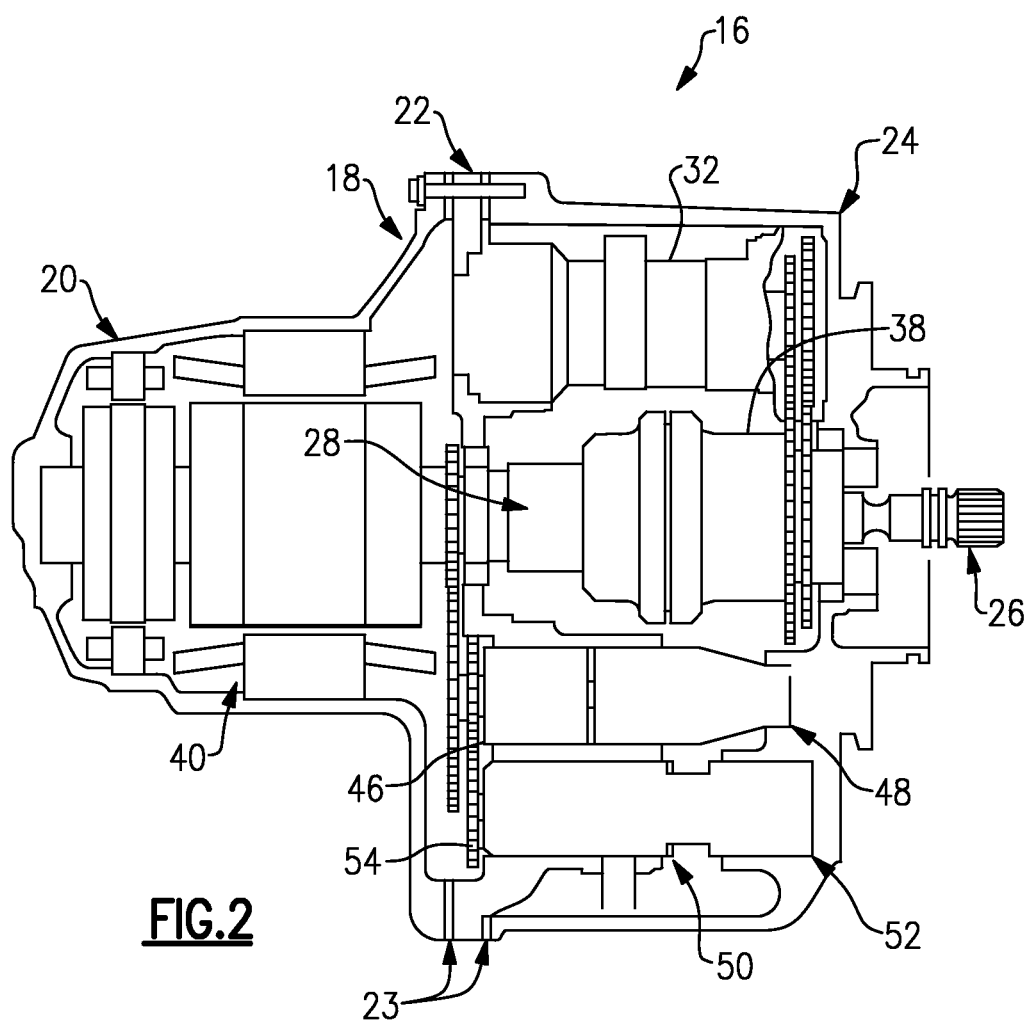
FIG. 2 is a cross-sectional schematic view of an example integrated drive generator.
Figure 3:
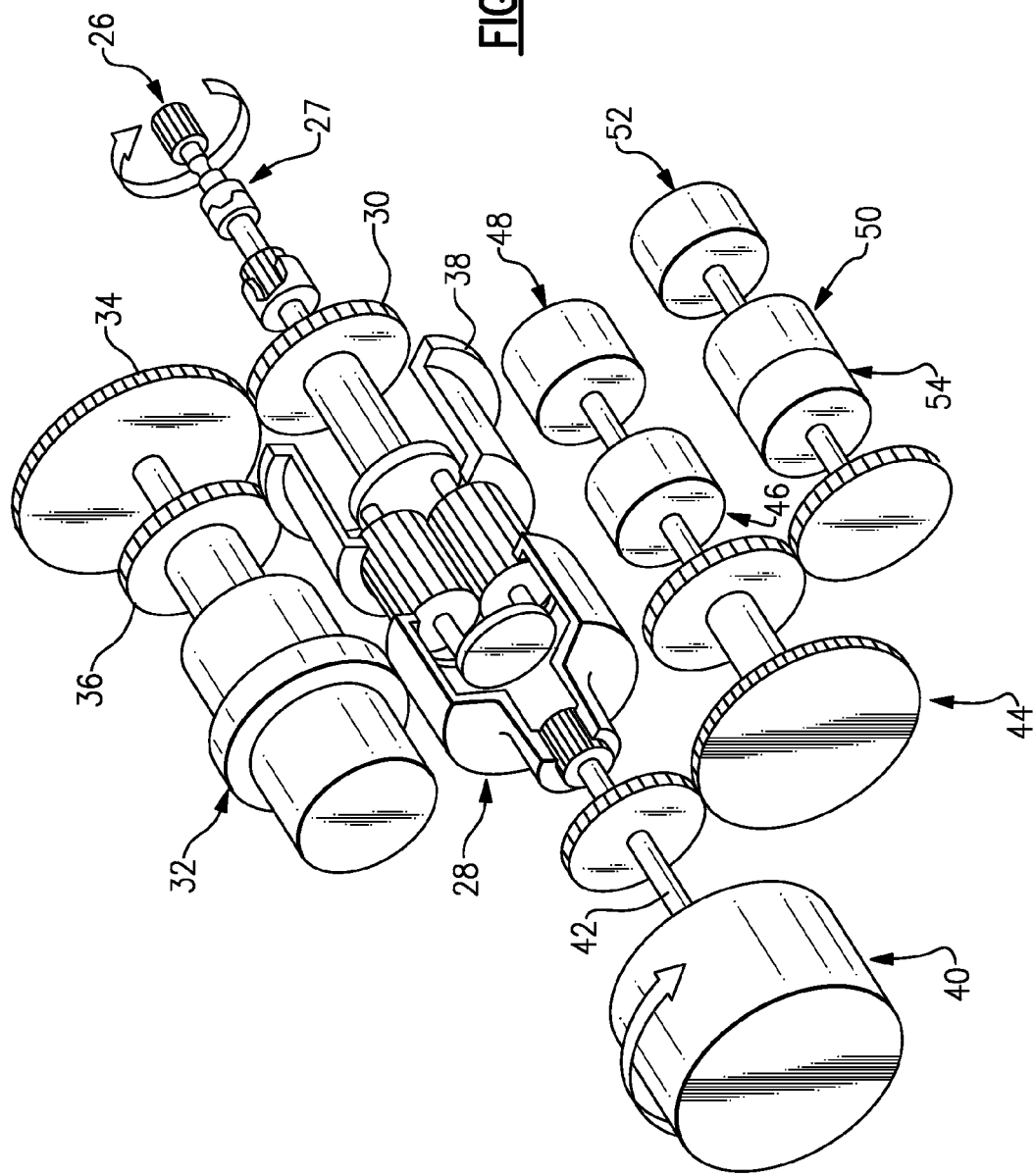
FIG. 3 is a schematic perspective view of a generator, a hydraulic unit and a differential assembly of the integrated drive generator shown in FIG. 2.

Referring to FIGS. 2 and 3, an example IDG 16 is illustrated. In the example, the IDG 16 includes a housing 18 having generator, center and input housing portions 20, 22, 24 secured to one another. A generator 40 is arranged in the generator housing portion 20. Seal plates 23 are provided on either side of the center housing 22 to seal the center housing 22 relative to the generator and input housing portions 20, 24.

An input shaft 26 receives rotational drive from the accessory drive gearbox 14. The rotational speed of the input shaft 26 varies depending upon the operation of the engine 12. To this end, as a result, a hydraulic unit 32 cooperates with the differential assembly 28 to convert the variable rotational speed from the input shaft 26 to provide a fixed rotational output speed to the generator 40.

The input shaft 26 rotationally drives a differential input gear 30 that is coupled to a hydraulic input gear 34 of the hydraulic unit 32. The differential input gear 30 is operatively coupled to the input shaft 26 by the disconnect assembly 27. The hydraulic output gear 36 is coupled to a differential trim gear 38. The hydraulic unit 32 increases or decreases the rotational speed provided to the differential assembly 28 from the hydraulic output gear 36 to provide a fixed rotational output speed, such as a 12,000 rpm speed. The variable rotational speed of the differential input gear 30 combines with the speed of the differential trim gear 38 to provide a fixed rotational speed to a generator input shaft 42.

In the example, a geartrain 44 cooperates with the generator input shaft 42, which rotates at a constant speed to rotationally drive a charge pump 46, deaerator 48, main scavenge pump 50, inversion pump 52 and generator scavenge pump 54. Thus, these components may be designed efficiently to operate at a fixed speed.

Figure 4:
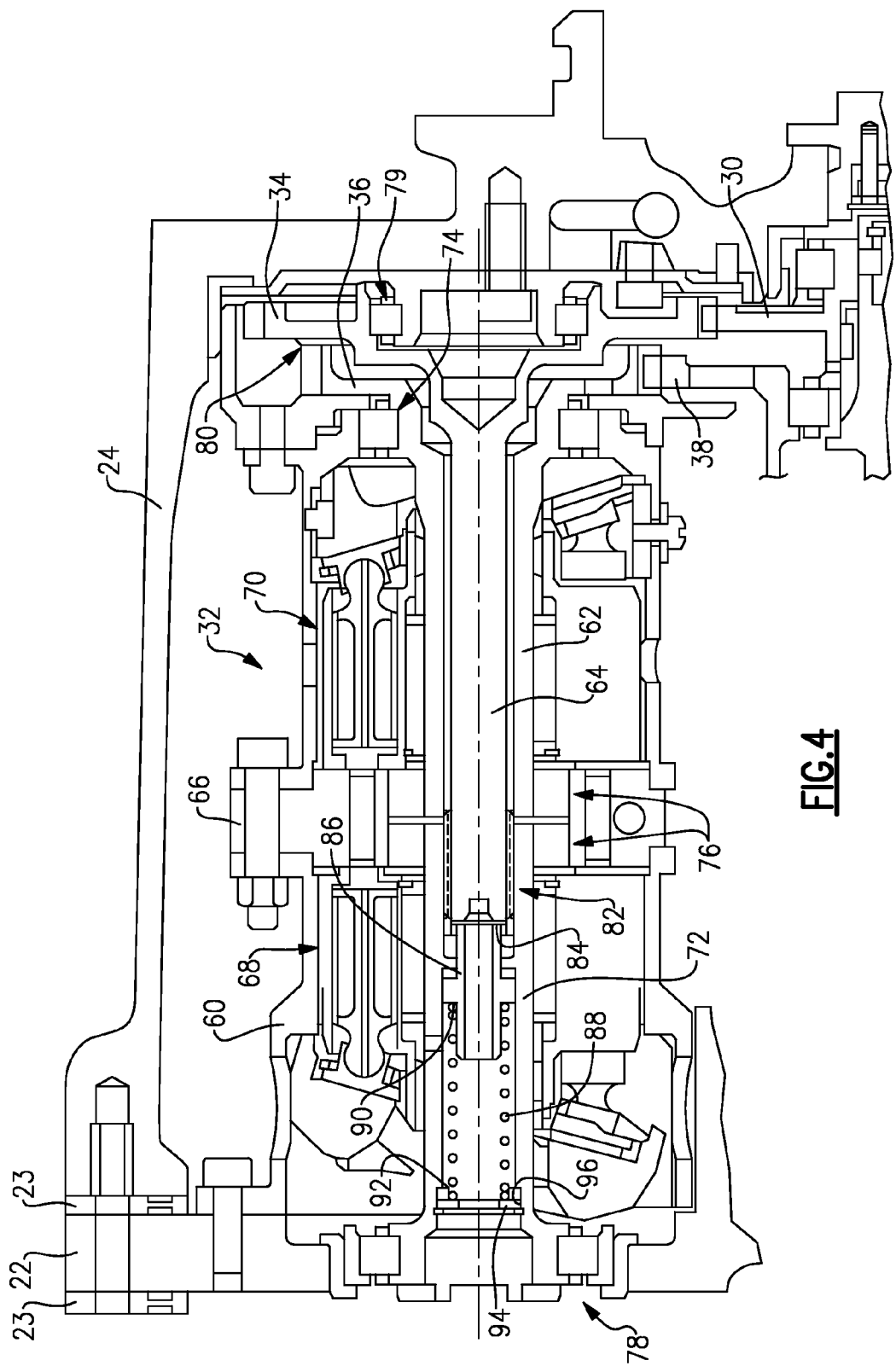
FIG. 4 is a cross-sectional view through the hydraulic unit.

Referring to FIG. 4, the hydraulic unit 32 includes a can 60 that houses and provides structural support for the hydraulic unit components. Trim and variable speed shafts 62, 64 are arranged coaxially with and nested relative to one another on one side of the hydraulic unit 32. The hydraulic input gear 34 is provided by the variable speed shaft 64, and the hydraulic output gear 36 is provided by the trim speed shaft 62. The hydraulic input and trim gears 34, 36 are laterally adjacent to one another and spaced laterally apart from one another by a gap 80.

A speed change shaft 72 is also arranged within the can 60 and is coaxial with the fixed and variable speed shafts 62, 64. A pump plate 66 separates first and second pumping assemblies 68, 70, which each include a wobbler and pistons. The pumping assemblies cooperate with one another to increase or decrease the rotational speed of the trim speed shaft 62.

A first bearing 74 supports the trim speed shaft 62 relative to the can 60, and a second bearing 76 supports the other end of the trim speed shaft 62 relative to the pump plate 66. Another second bearing 76 supports the speed change shaft 72 relative to the pump plate 66, and a third bearing 78 supports the other end of the speed change shaft 72 relative to the center housing 22. A fourth bearing 79 supports the variable speed shaft 64 relative to the input housing 24.

The variable speed shaft 64 and the speed change shaft 72 are rotationally fixed relative to one another via a splined connection 82, which provides a slip fit connection. The splined connection 82 permits the variable and speed change shafts 64, 72 to move axially relative to one another. The variable speed shaft 64 includes an end 84. A biasing assembly is arranged within a hollow of the speed change shaft 72 to cooperate with the variable speed shaft 64, in the example, and maintain a desired gap 80 between the hydraulic input and output gears 34, 36.

The biasing assembly includes a loading member 86 that abuts the end 84. A retainer 94 is received within a groove 96 within the speed change shaft 72. A biasing element 88, for example, a helical spring, engages first and second spring seats 90, 92, which are respectively provided by the loading member 86 and the retainer 94. The biasing element 88 acts on the loading member 86 to urge the variable speed shaft 64 rightward (as depicted in FIG. 4) and space the hydraulic input and output gears 34, 36 apart from one another to maintain the desired gap 80.

Although an example embodiment has been disclosed, a worker of ordinary skill in this art would recognize that certain modifications would come within the scope of the claims. For that reason, the following claims should be studied to determine their true scope and content.

What is claimed is:

1. A gear assembly comprising:
   first and second shafts concentric with one another;
   first and second gears respectively provided by the first and second shafts and arranged adjacent to one another; and
   a biasing assembly cooperating with at least one of the first and second shafts to maintain a desired gap between the first and second gears, wherein the biasing assembly includes a loading member and a biasing element, the loading member engaging an end of one of the first and second shafts and the biasing element urging the loading member against the end.

2. The gear assembly according to claim 1, comprising a third shaft coaxial with the first and second shafts and including a hollow receiving the biasing assembly, the second shaft arranged within the first shaft, the second shaft providing the end.

3. The gear assembly according to claim 2, wherein the biasing assembly includes a retainer, and first and second spring seats are respectively provided by the loading member and the retainer, the biasing element includes a helical spring engaging the first and second spring seats.

4. The gear assembly according to claim 3, wherein the third shaft is rotationally fixed relative to the second shaft with a splined connection, the splined connection permitting the second and third shafts to slide axially relative to one another.

5. The gear assembly according to claim 4, comprising a bearing supporting an end of the second shaft opposite the splined connection.

6. The gear assembly according to claim 5, comprising pairs of bearings supporting each of the second and third shafts.

7. An integrated drive generator comprising:
   a housing enclosing a generator, a hydraulic unit and a differential assembly, the hydraulic unit and differential assembly configured to cooperate with one another and convert a variable speed and provide a fixed speed to the generator; and
   wherein the hydraulic unit includes:
      first and second shafts concentric with one another;
      first and second gears respectively provided by the first and second shafts and arranged adjacent to one another; and
      a biasing assembly cooperating with at least one of the first and second shafts to maintain a desired gap between the first and second gears.

8. The integrated drive generator according to claim 7, comprising an input shaft configured to receive a variable speed and provide the variable speed to the hydraulic unit and the differential assembly.

9. The integrated drive generator according to claim 7, wherein the second shaft is a variable speed shaft, and the first shaft is a trim speed shaft.

10. The integrated drive generator according to claim 7, wherein the hydraulic unit includes a pump plate separating first and second pumping assemblies, each including a wobbler and pistons.

11. The integrated drive generator according to claim 7, wherein the biasing assembly includes a loading member and a biasing element, the loading member engaging an end of one of the first and second shafts and the biasing element urging the loading member against the end.

12. The integrated drive generator according to claim 11, comprising a third shaft coaxial with the first and second shafts and including a hollow receiving the biasing assembly, the second shaft arranged within the first shaft, the second shaft providing the end.

13. The integrated drive generator according to claim 12, wherein the biasing assembly includes a retainer, and first and second spring seats are respectively provided by the loading member and the retainer, the biasing element includes a helical spring engaging the first and second spring seats.

14. The integrated drive generator according to claim 13, wherein the third shaft is rotationally fixed relative to the second shaft with a splined connection, the splined connection permitting the second and third shafts to slide axially relative to one another.

15. The integrated drive generator according to claim 14, comprising a bearing supporting an end of the second shaft opposite the splined connection.

16. The integrated drive generator according to claim 15, comprising pairs of bearings supporting each of the second and third shafts.

17. A method of spacing adjacent gears in an integrated drive generator, the integrated drive generator comprising a housing enclosing a generator, a hydraulic unit and a differential assembly, wherein the hydraulic unit and differential assembly are configured to cooperate with one another and convert a variable speed and provide a fixed speed to the generator, the method comprising the steps of:

provided concentric shafts having adjacent gears laterally spaced from one another; and biasing the shafts relative to one another to maintain a desired gap between the first and second gears.

18. The method according to claim 17, wherein the biasing step includes operatively engaging an end of one of the shafts with a helical spring.

19. The method according to claim 18, wherein the providing step includes coupling a third shaft to the second shaft with a splined connection, the helical spring arranged within the third shaft.

* * * * *